(12) United States Patent
Eibler

(10) Patent No.: US 6,196,368 B1
(45) Date of Patent: Mar. 6, 2001

(54) POWER TRANSMISSION UNIT WITH HYDRAULIC CLUTCH DEPENDENT ON ROTATIONAL SPEED

(75) Inventor: Gerhard Eibler, Heiligenkreuz a.W. (AT)

(73) Assignee: Steyr-Daimler-Puch Fahrzeugtechnik AG & Co. KG, Vienna (AU)

( * ) Notice: Subject to any disclaimer, the term of this patent is extended or adjusted under 35 U.S.C. 154(b) by 0 days.

(21) Appl. No.: 09/406,652

(22) Filed: Sep. 27, 1999

(30) Foreign Application Priority Data

Sep. 25, 1998 (AT) .................................................. 625/98 U

(51) Int. Cl.[7] .......................... F16D 43/284; F16D 13/72
(52) U.S. Cl. .................... 192/35; 192/103 F; 192/113.21
(58) Field of Search .................................. 192/103 F, 35, 192/54.3, 58.42, 113.21; 74/606 R

(56) References Cited

U.S. PATENT DOCUMENTS

| | | | |
|---|---|---|---|
| 4,022,272 | * 5/1977 | Miller | 192/113.21 X |
| 5,119,923 | * 6/1992 | Jonsson et al. | 192/103 F X |
| 5,632,185 | * 5/1997 | Gassmann | 192/103 F X |
| 5,709,627 | 1/1998 | Teraoaka . | |
| 5,884,739 | * 3/1999 | Constantin | 192/103 F X |
| 5,967,275 | * 10/1999 | Gasch | 192/103 F X |
| 5,967,285 | * 10/1999 | Mohan et al. | 192/103 F |

* cited by examiner

Primary Examiner—Rodney H. Bonck
(74) Attorney, Agent, or Firm—Bachman & LaPointe, P.C.

(57) ABSTRACT

A power transmission unit having an input section and an output section and a hydraulic clutch which depends on the rotational speed difference, in which unit a hydrostatic displacement machine (20) generates a pressure on the occurrence of a rotational speed difference between the input section (1; 6) and the output section (6; 1), which pressure causes a reduction in the rotational speed difference. The displacement machine consists of parts (21, 22) respectively drive-connected to the input section and the output section and one of the sections (1; 6) forms a housing (4) containing the displacement machine, the displacement machine drawing in working fluid from a suction space. In order to prevent sealing problems and pressure build-up not due to foaming, the suction space (14) is formed by a shell (10; 40) surrounding the housing (4) and firmly connected to the latter in a fluid-tight manner, which shell is in fluid connection with the inside of the housing (4), and the suction space and the inside of the housing are completely filled with working fluid. The suction space (14) can be connected to a chamber (34) which is partially bounded by a flexible wall (35). The fluid filling can be under positive pressure.

8 Claims, 2 Drawing Sheets

FIG. I

POWER TRANSMISSION UNIT WITH HYDRAULIC CLUTCH DEPENDENT ON ROTATIONAL SPEED

BACKGROUND OF THE INVENTION

The invention relates to a power transmission unit having an input section and an output section and a hydraulic clutch which depends on the rotational speed difference, in which unit a hydrostatic displacement machine generates a pressure on the occurrence of a rotational speed difference between the input section and the output section, which pressure causes a reduction in the rotational speed difference, the displacement machine consisting of parts respectively drive-connected to the input section and the output section and one of the sections forming a housing containing the displacement machine, the displacement machine drawing in working fluid from a suction space.

Such power transmission units are more particularly used in drivetrains of motor vehicles, particularly four-wheel drive motor vehicles, either together with a differential gearbox, where the hydraulic clutch limits the differential effect, or for driving the second driven axle, the torque transmitted depending on the difference between wheel rotational speed and the drive shaft connected to the wheels of the other axle. The pressure generated by the displacement machine acts either on a clutch, preferably on a plate clutch, or by hindering the reactive motion of the displacement machine. The effect can be influenced by various valves, either automatically acting valves or externally actuated valves.

DESCRIPTION OF THE PRIOR ART

Such a power transmission unit is known from U.S. Pat. No. 5,709,627, in which the displacement machine draws in working fluid via a suction space from a sump provided at a lower level in an outer housing. In this arrangement, the suction space is bounded by a wall fastened to the stationary outer housing, which wall must be sealed relative to the rotating power transmission unit. If this seal leaks, even if only slightly—which it usually does—air is drawn in instead of the working fluid and this leads to further foaming of the working fluid (even a throttle valve at the outlet of the displacement machine leads to this) and hinders the build-up of the necessary pressure and, in addition, requires a non-return valve. Matters are made more difficult by the fact that the diameter of the seal must be large because of the suction space and the difference between the rotational speed of the output section and the outer housing is high. This produces very high sliding velocities and, in consequence, rapid wear of the seal.

SUMMARY OF THE INVENTION

The object of the invention is, therefore, to improve matters in such a way that the disadvantages quoted do not occur. The sealing problems are to be solved, and the build-up of pressure is not to be hindered by foaming, with the simplest possible construction and low system weight.

For this purpose and in accordance with the invention, the suction space is formed by a shell surrounding the housing and firmly connected to the latter in a fluid-tight manner, which shell is in fluid connection with the inside of the housing, and the suction space and the inside of the housing are completely filled with working fluid. The shell tightly surrounding the housing forms a hermetically closed suction space without seals and foaming cannot occur at all due to the complete filling. Due to the complete filling, the operational conditions (lubrication and heat removal) for the clutch plates are also optimum and no non-return valve is necessary. The number of parts and the installation volume is also smaller because no sump and no suction lines are required. The only seal still present, between the input section and the output section, has depending on the operating condition—a substantially smaller velocity difference (down to almost none) to deal with and its diameter is smaller.

The fluid connection with the inside of the housing is formed by at least one feed duct to the displacement machine and by drain ducts through which leakage and throttling fluid flows back into the suction space after passing through the plate clutch.

In a preferred embodiment, the suction space is connected to a chamber which is partially bounded by a flexible wall. By this means, a small positive pressure can be maintained within the appliance, which generally improves the action, permits a change to the characteristic and avoids the occurrence of a depression in the case of unfavorable heat dynamics. A depression could draw in air and external dirt and, in consequence, lead to damage to the small seal. The flexible wall is preferably a diaphragm but the shell itself could also be flexible. In the latter case, no separate chamber has to be provided.

In order to improve the cooling and the heat dynamics, the shell can have cooling ribs. If the shell consists of sheet metal, this simultaneously provides the flexible wall.

In a development of the invention, the suction space is connected to the inside of the housing by a duct in which a self-closing valve is provided. It is preferably an expanding material valve which, when it reaches a predetermined temperature, closes the duct. Such a valve closes without intervention from the outside if, in the case of overload, the temperature rises and exceeds a certain value. On cooling, it opens again.

BRIEF DESCRIPTION OF THE DRAWINGS

The invention is described and explained below using figures. In these.

DESCRIPTION OF THE PREFERRED EMBODIMENTS

Figure 1:
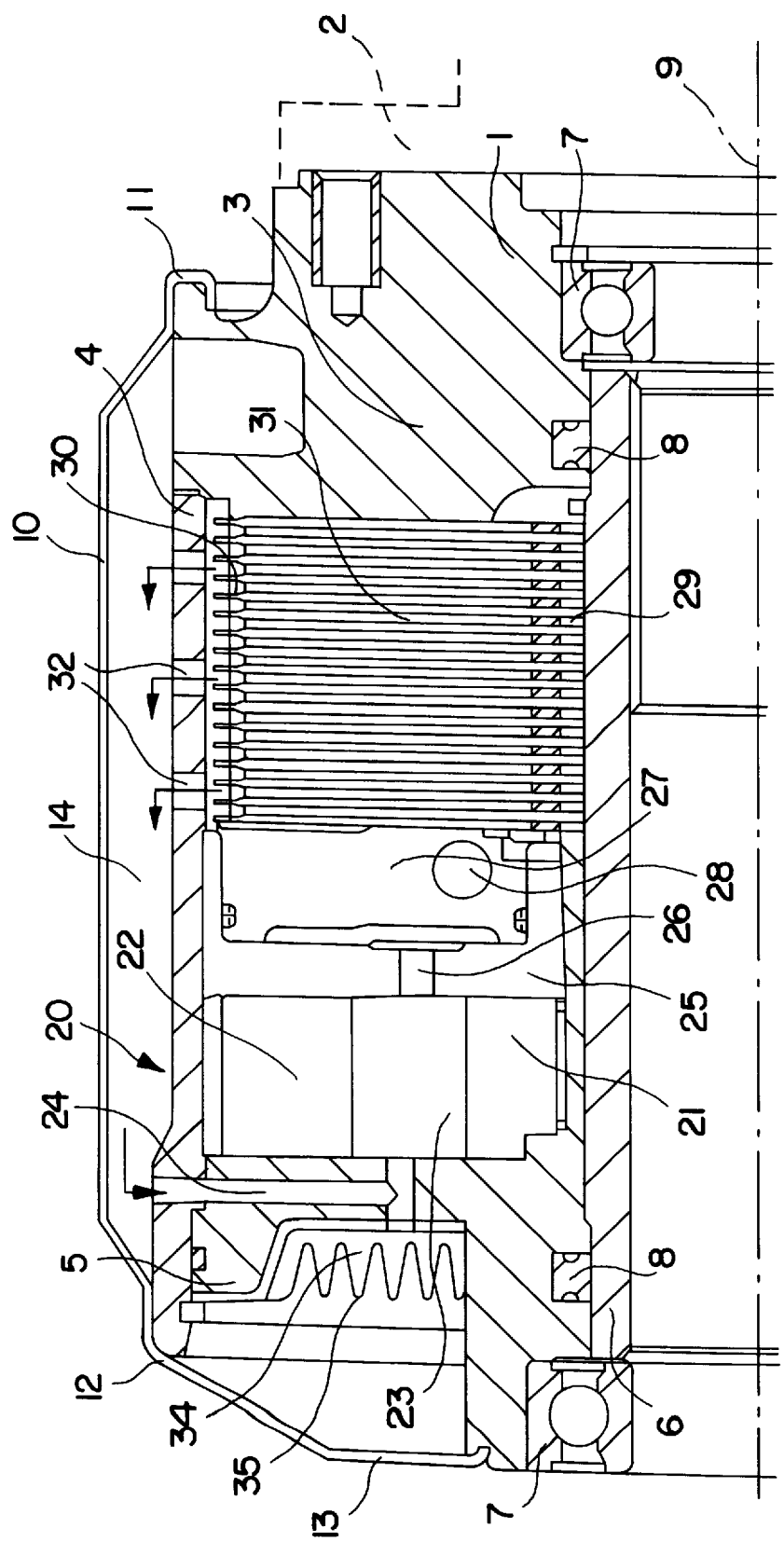
FIG. 1 shows a longitudinal section through an appliance in accordance with the invention, in a first embodiment.

In FIG. 1, the input section is designated by 1; it could also be the output section onto which a shaft 2 (shown by interrupted lines) is flanged by means of bolts which are only indicated. It consists of a front plate 3, an essentially cylindrical housing 4 which is connected integrally or permanently to the front plate 3 and of an end plate 5, which is releasable for assembly purposes, but which is tightly connected to the housing 4. The output section 6 (it could also be the input section) is a hollow shaft into which a shaft (which is only indicated) is introduced by means of splines. The said output section is supported by bearings 7 in the front plate 3 and/or the end plate 5 of the input section 1 and is sealed relative to the latter by means of seals 8. Simple square rings are sufficient for this purpose because the rotational speed difference to be dealt with is, on average, very small. The axis of rotation or center line is designated by 9.

The housing 4 is surrounded by a shell 10 which consists, for example, of sheet metal and is tightly connected all round to the front plate 3 by means of beading 11 at one end and is tightly connected to the end plate 5 by means of beading 12 at the other end. It can, in addition, form a shell extension 13. A hermetically closed suction space 14 is formed between the housing 4 and the shell 10.

A hydrostatic displacement machine 20, which consists of an inner part 21 and an outer part 22, is located in the inside of the housing 4. The inner part 21 is torsionally connected to the output section 6 and the outer part 22 is torsionally connected to the input section 1 and, in fact, to the housing 4. The corresponding coupling teeth are only indicated. A working space 23, which is connected to the suction space 14 by means of a suction duct 24, extends between the inner part 21 and the outer part 22. At the other end, an insert 25, which contains a pressure duct 26, if necessary with a throttle valve (not shown) and a piston 27, adjoins the hydrostatic displacement machine 20. The piston 27 is acted on by the hydraulic fluid led through the pressure duct 26. A part of this hydraulic fluid can be guided through a piston 27 via a throttle valve 28 into a clutch space 31, in which are arranged a number of inner plates 29 and outer plates 30. The former are connected to the output section 6 so that they are torsionally connected but can be displaced and the latter are similarly connected to the housing 4 of the input section 1.

Because of the hermetic closure of the suction space 14, the clutch space 31 is also continually and completely filled with working fluid. There is absolutely no air anywhere in the power transmission unit which, with the exception of the two seals 8, is hermetically sealed. The working fluid can flow through outlet holes 32 from the clutch space 31 back into the suction space 14. Since there is always a certain internal leakage, or passage of working fluid through the throttle valve 28 into the clutch space 31, there is always a flow through the latter, which creates optimum operating conditions for the clutch plates 29, 30.

The suction duct 24 is, furthermore, connected to a chamber 34 which, in the present case, is located in the end plate 5 and is bounded by a flexible wall 35, a diaphragm in the present case. Because of this, the volume of the chamber 34 is variable and it is possible to compensate for thermal expansion differences without a depression occurring in the inside of the housing. A positive pressure can be generated and maintained within the power transmission unit by pre-loading the flexible wall 35.

Figure 2:
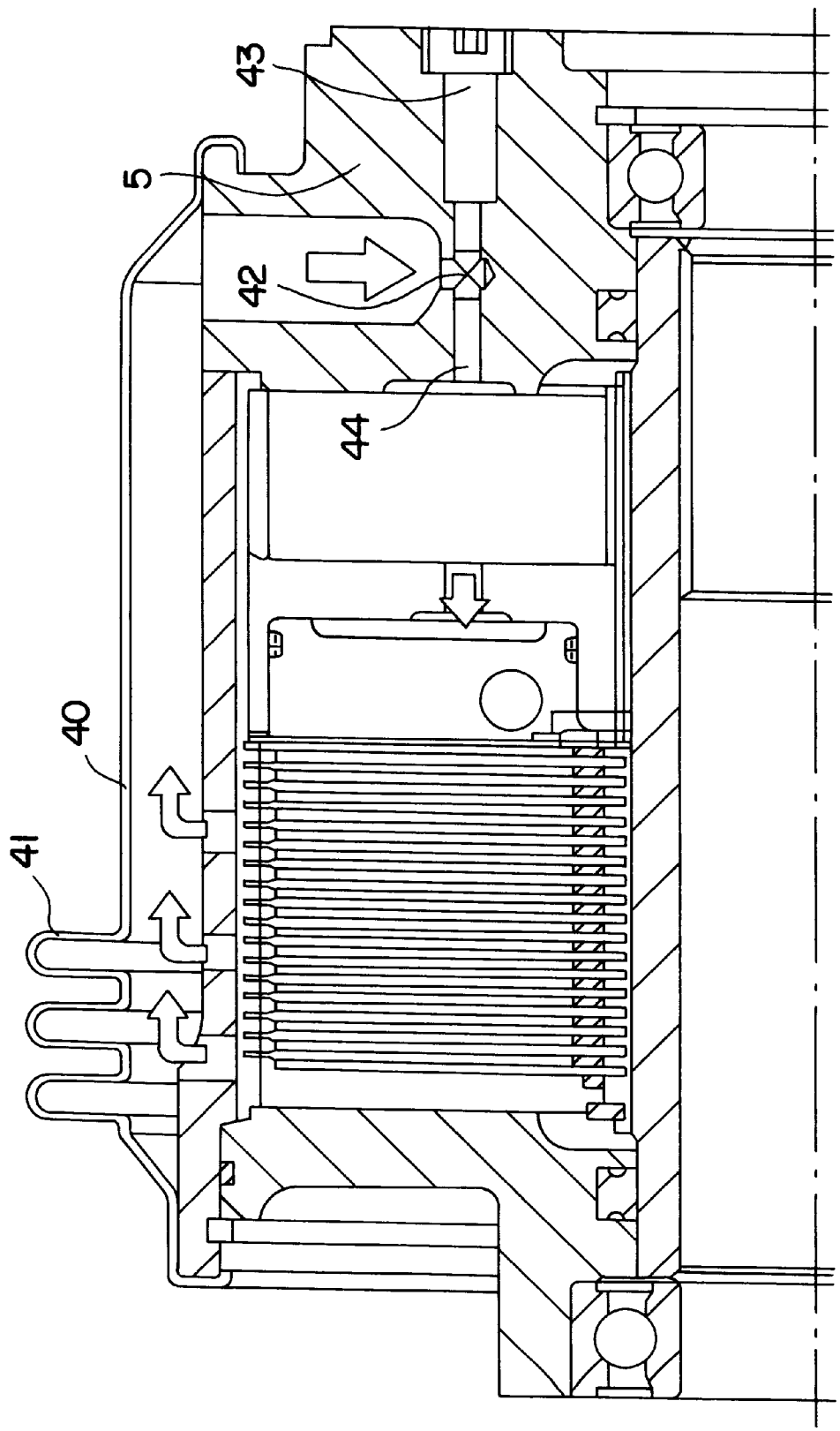
FIG. 2 shows a longitudinal section through an appliance in accordance with the invention, in a second embodiment.

The embodiment of FIG. 2 differs from that of FIG. 1 only in the fact that a shell 40 is provided with cooling ribs 41. These cooling ribs can either be integral with the shell, it is then to a certain extent configured as a bellows, or they are drawn onto the shell 40. In the case where the shell is a bellows, the cooling ribs simultaneously represent a flexible wall which can accommodate thermal expansions of the fluid inside it or ensure a certain positive pressure.

This variant also differs from that of FIG. 1 in that a self-closing valve 42 is provided in the end plate 5. This valve 42 closes the suction duct 44 under the action of an expanding material element 43 when a certain temperature is reached. The displacement machine can then no longer build up pressure so that the load decreases and the power transmission unit can cool down again. In addition, the variant of FIG. 2 is laterally transposed relative to FIG. 1, which is intended to indicate that two such power transmission units, one for a left-hand wheel and one for an associated right-hand vehicle wheel, can also be accommodated jointly in one housing.

Within the scope of the invention, it is possible to depart in many details from the embodiment examples shown. As an example, the hydrostatic displacement machine can be configured very differently, both with respect to the shape of its rotors and with respect to their arrangement in the housing 4. The plate clutch is not absolutely necessary either and it is also possible to achieve the effect of reducing the rotational speed difference without such a clutch. Finally, the power transmission unit can be arranged at different locations in the drivetrain, in particular in the force path before or after the axle differential. It can also be arranged in the inside of a housing containing the axle differential. The invention then offers the possibility, without additional measures, of using different fluids for the differential and for the power transmission unit.

What is claimed is:

1. A power transmission unit having an input section and an output section and a hydraulic clutch engagement of which depends on a rotational speed difference between the input section and the output section, in which unit a hydrostatic displacement machine (20) generates a pressure on the occurrence of a rotational speed difference between the input section (1; 6) and the output section (6; 1), which pressure causes a reduction in the rotational speed difference, the displacement machine consisting of parts (21, 22) respectively drive-connected to the input section and the output section and one of the sections (1; 6) forming a housing (4) containing the displacement machine, the displacement machine drawing in working fluid from a suction space, wherein the suction space (14) is formed by a shell (10; 40) surrounding the housing (4) and firmly connected to the latter in a fluid-tight manner, which suction space is in fluid connection with the inside of the housing (4), and wherein the suction space and the inside of the housing are completely filled with working fluid.

2. The power transmission unit as claimed in claim 1, wherein the suction space (14) is connected to a chamber (34) which is partially bounded by a flexible wall (35).

3. The power transmission unit as claimed in claim 2, wherein the flexible wall (35) is a diaphragm.

4. The power transmission unit as claimed in claim 1, wherein the shell (40) itself is flexible.

5. The power transmission unit as claimed in claim 1, wherein the fluid filling is under positive pressure.

6. The power transmission unit as claimed in claim 1, wherein the shell (40) has cooling ribs.

7. The power transmission unit as claimed in claim 1, wherein the suction space (14) is connected to the inside of the housing (4) by a duct (44) in which a self-closing valve (42) is provided.

8. The power transmission unit as claimed in claim 7, wherein the self-closing valve (42) contains an expanding material element (43) which, when it reaches a predetermined temperature, closes the valve (42).

* * * * *